March 14, 1961 E. J. PETHERICK 2,975,409

DIGITAL ENCODERS AND DECODERS

Filed Dec. 28, 1954 6 Sheets-Sheet 1

*Inventor*
EDWARD JOHN PETHERICK
*By* Stevens, Davis, Miller & Mosher
*Attorneys*

Inventor
EDWARD JOHN PETHERICK
By Stevens, Davis, Miller & Mosher
Attorneys

March 14, 1961 E. J. PETHERICK 2,975,409

DIGITAL ENCODERS AND DECODERS

Filed Dec. 28, 1954 6 Sheets-Sheet 3

Inventor
EDWARD JOHN PETHERICK
By
Stevens, Davis, Miller & Mosher
Attorneys

March 14, 1961 E. J. PETHERICK 2,975,409

DIGITAL ENCODERS AND DECODERS

Filed Dec. 28, 1954 6 Sheets-Sheet 4

Inventor
EDWARD JOHN PETHERICK
By
Stevens, Davis, Miller & Mosher
Attorneys

Inventor
EDWARD JOHN PETHERICK
By Stevens, Davis, Miller & Mosher
Attorneys

March 14, 1961 E. J. PETHERICK 2,975,409

DIGITAL ENCODERS AND DECODERS

Filed Dec. 28, 1954 6 Sheets-Sheet 6

Inventor
EDWARD JOHN PETHERICK
By
Stevens, Davis, Miller & Mosher
Attorneys 2,975,409

DIGITAL ENCODERS AND DECODERS

Edward John Petherick, Rowledge, near Farnham, England, assignor, by mesne assignments, to International Business Machines Corporation, New York, N.Y., a corporation of New York Filed Dec. 28, 1954, Ser. No. 478,031

Claims priority, application Great Britain Jan. 7, 1954

19 Claims. (Cl. 340—347)

Figure 1:
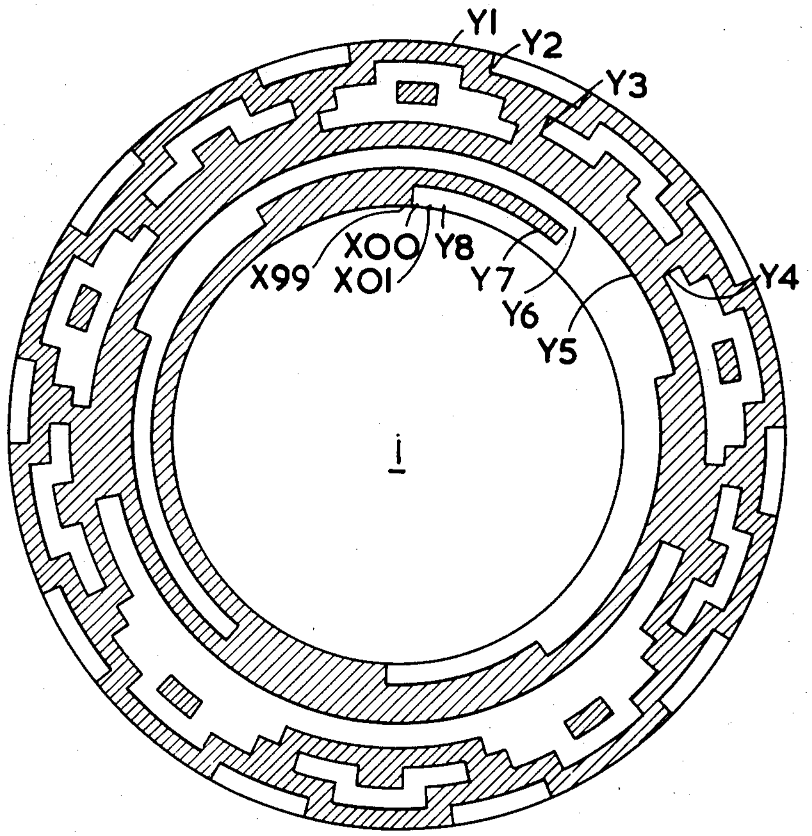

The present invention relates to digital encoders and decoders.

Digital encoders are used for representing a magnitude, such as that of a displacement or rotation, in digital form. The digital representation may then be decoded into decimal digits, expressed in analogue form or, alternatively, may be processed directly in a digital computing machine.

According to the present invention, a digital encoder comprises means for representing a magnitude in a cyclic permuting binary-decimal code in which the digits 0 to 9 of a cyclic permuting decimal code are represented in a binary code which is cyclic permuting at least for the representation of the digits 0 through 9 to 0.

Each cyclic permuting decimal digit is, therefore, represented by a binary word consisting of a predetermined number of binary digits. The binary words representing two consecutive decimal digits, and also the binary words representing the decimal digits 0 and 9, differ by only one binary digit.

The type of cyclic permuting decimal code preferred for use in the present invention is one in which the digits of the cyclic permuting decimal code are obtained from a normal decimal number by substituting for a digit in the decimal number the complement on nine of the digit whenever the immediately preceding digit of greater significance in the decimal number is odd. A cyclic permuting decimal digit is, for the purposes of this specification and appended claims, deemed to have an order of significance in a number expressed in the cyclic permuting decimal code, which is the same as that of the corresponding normal decimal digit in the normal decimal number from which it is derived.

According to a feature of the present invention, a digital encoder comprising means for representing a magnitude in a cyclic permuting binary-decimal code in which the digits 0 to 9 of the cyclic permuting decimal code of the preferred type described are represented in a binary code which is cyclic permuting at least for the representation of the digits 0 to 9 and wherein a binary word representing a digit is the same, except for one binary digit, as the binary word representing its complement on 9.

The binary code is preferably such that an odd number of digits 1 in a binary word represents an odd cyclic permuting decimal digit.

According to a further feature of the present invention, a digital decoder for converting into normal decimal form a cyclic permuting binary-decimal code wherein the binary word representing a digit in the cyclic permuting code of the preferred type described in the same, except for a complementing binary digit, as the binary word representing the cyclic permuting decimal digit's complement on nine, comprises means for changing the complementing binary digit of the binary word representing a cyclic permuting decimal digit when, and only when, the normal (decoded) decimal of next greater significance than the cyclic permuting decimal digit is odd.

When the binary code used is such that an odd number of binary digits 1 represents an odd decimal digit, the complementing binary digit representing a cyclic permuting decimal digit may conveniently be changed when, and only when, the total number of digits 1 in the cyclic permuting binary words representing cyclic permuting decimal digits of higher orders of significance is odd.

In order that the cyclic permuting decimal code of the preferred type may be better understood, an example of the operation of the rule for the conversion of a normal decimal number to the expression of the number in the cyclic permuting decimal code will now be given.

Let the decimal number 497649 be considered. The cyclic permuting decimal word corresponding to this number is 492349. The conversion is carried out as follows. A nought is considered notionally to precede the most significant digit of the decimal number. Thus the most significant digit 4 in the decimal number is notionally preceded by an even digit and thus appears in the cyclic permuting code as the digit 4. The next less significant digit 9 is preceded by an even digit (4) and thus appears in the cyclic permuting code as the digit 9. The next less significant digit 7 in the decimal number is preceded by an odd digit (9) and thus appears in the cyclic permuting code as the complement on 9 of 7, that is to say, the digit 2. The next less significant digit 6 is preceded by an odd digit (7) and thus appears as the complement on 9 of 6, that is to say, the digit 3, and so on until the whole number has been converted.

It will also be seen, by following this rule, that the normal decimal number 497650 will be represented by 492359 in the cyclic permuting decimal code. Therefore, whereas in changing from the normal decimal number 497649 to the normal decimal number 497650 two digits are altered, in changing in the cyclic permuting code from 492349 to 492359 only one digit is altered, and that digit is altered by only unity.

It is convenient at this juncture to consider the rule which must be followed in converting a cyclic permuting decimal word in the cyclic permuting decimal code of the preferred type into its corresponding normal decimal number.

This rule is that a normal decimal number is obtained from digits in the corresponding cyclic permuting decimal code by the substitution for a digit in the code the complement on nine of that digit when and only when the decoded, normal, decimal digit of next greater order of significance is odd. A convenient method of ascertaining whether the decoded decimal digits of greater significance is odd or even is to evaluate the sum of all the uncoded cyclic permuting decimal digits of greater significance than that of the digit to be converted. If this sum is odd, then the decoded normal decimal digit of next greater significance than that of the digit to be converted is odd and the cyclic permuting decimal digit should be complemented on nine. If the sum is even, then the decoded normal decimal digit of next greater significance is even, and the cyclic permuting decimal digit should not be complemented on nine but should be left unchanged. For example, if the digits in the cyclic permuting decimal code are 492349, the corresponding normal decimal number is 497649. The digits 2 and 3 are replaced by their complements on nine (namely 7 and 6) because the sum of the preceding more significant digits (namely 13 and 15 respectively) is odd in each case. The sums of the preceding digits in the case of the digits 4, 9, 4 and 9 taken in order of decreasing significance are 0, 4, 18 and 22 respectively and are all even. Thus these digits remain unchanged.

In the present invention, a digit of a number represented in the cyclic permuting decimal code is represented in a cyclic permuting binary code by a group of binary digits. Thus each digit in the cyclic permuting decimal code may be represented in a parallel mode by a pattern of potentials set upon wires or in the serial mode by the presence or absence of pulses in a pulse train. It is necessary that the cyclic permuting binary code so used should be cyclic permuting in representing the decimal digits 0 through 9 to 0. That is to say that the cyclic permuting binary code should be such that not only does not more than one binary digit change for each unit change between 0 and 9, but also not more than one binary digit changes during the change of in representation of decimal digits from 9 directly to 0.

In order that a cyclic permuting binary decimal code employing a cyclic permuting decimal code of the preferred type may be easily decoded, it is often convenient that the binary word representing each decimal digit be the same, except for one binary digit herein termed the complementing binary digit, as the binary word representing the decimal digit's complement on 9. That is to say, the binary words representing the decimal digits N and (9—*N*) should, in this case, differ by only one binary digit, as in the following examples.

Figures 3, 7:
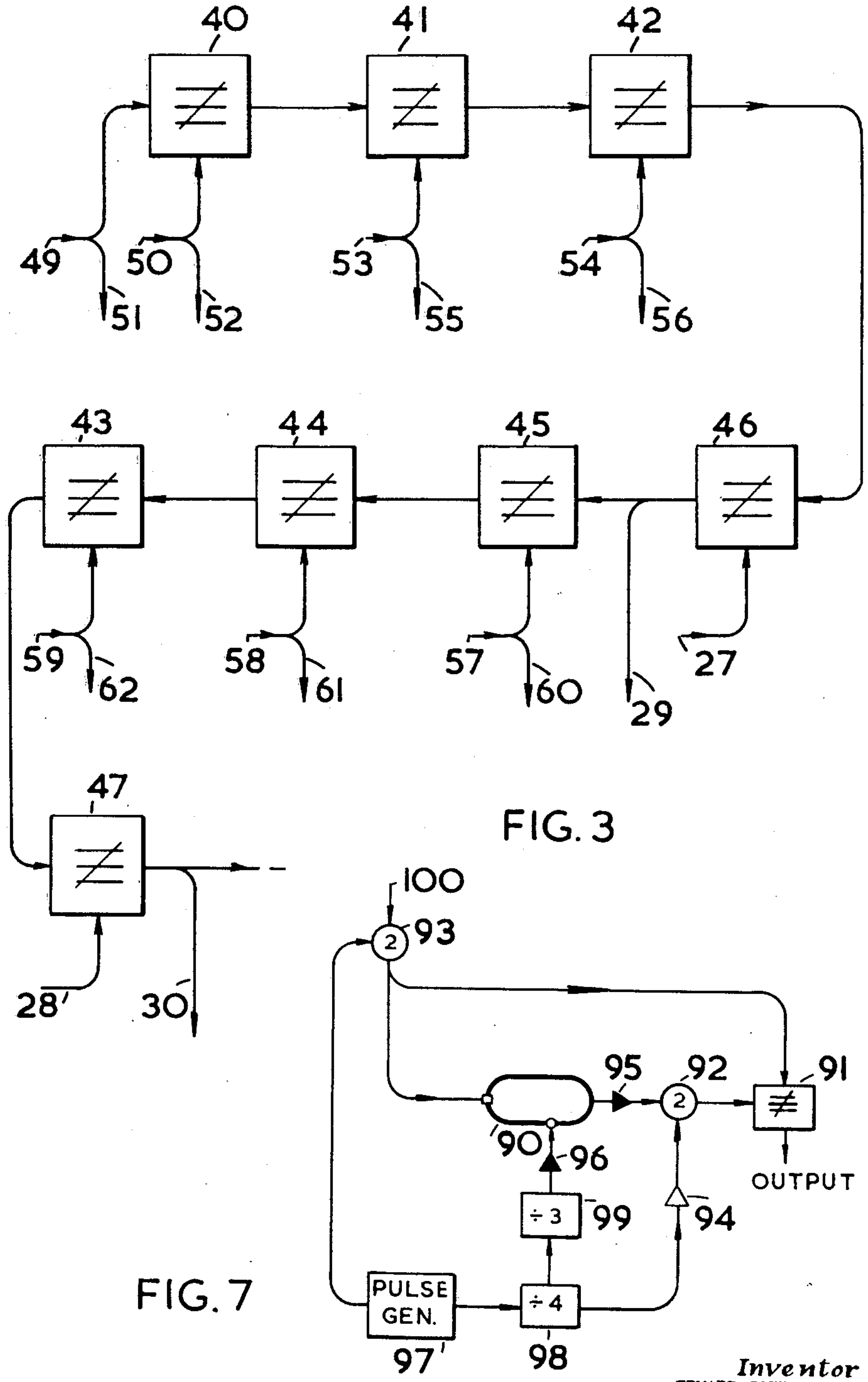
Figure 8:
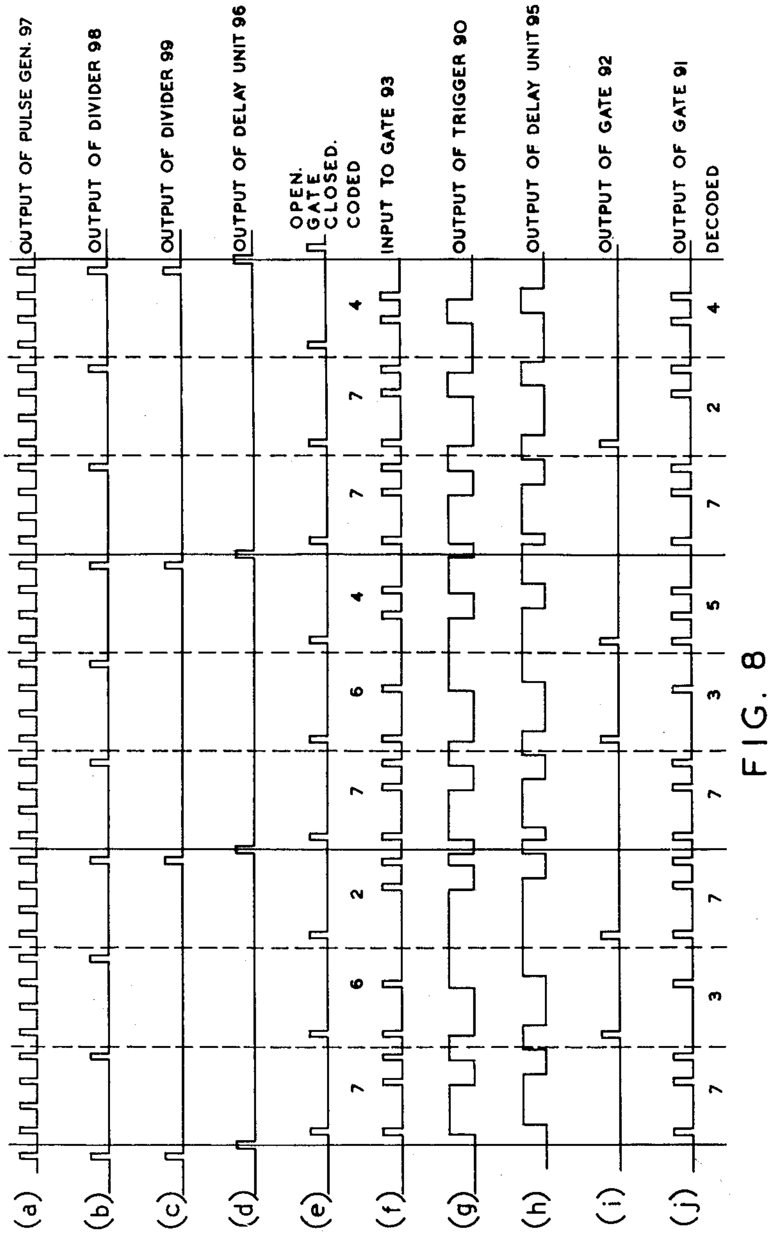

Figure 7 is a logical circuit diagram of part of a decoder for converting digital information, presented in the serial mode, into decimal form and Figure 8 is a series of graphical waveforms explanatory of the operation of the circuit shown in Figure 7.

In the drawings, Figure 1 shows a disc commutator 1 comprising a copper carrier divided notationally into one-hundred sectors. The portions of the commutator which are shown as cross-hatched represent lands. The remaining portions of the commutator represent depressions in the surface of the copper, the depressions being filled with a suitable insulating material. The commutator is divided notionally into eight annular rings Y1 to Y8, each of these annular rings being divided notionally into the one-hundred segments corresponding to the one-hundred sectors. The outer four annular rings Y1 to Y4 are employed to define, by means of the cyclic permuting binary code of Example II, the less significant digit of a cyclic permuting decimal word in the cyclic permuting decimal code of the preferred type. The cyclic permuting decimal word itself defines, at any given point round the commutator, one of the one-hundred sectors. The inner four rings Y5 to Y8 are employed to define in a similar manner the more significant digit of the cyclic permuting decimal word defining a particular sector. Each annular ring defines one binary digit as a 1 or a 0 according to whether there is a land or a depression present at a given point. The lands and depressions are so arranged that the innermost ring Y8 defines the first (W) binary digit defining the most significant decimal digit, the next ring Y7 defines the second (X) binary digit defining the more significant decimal digit and so on, the outermost ring Y1 defining the last (Z) binary digit defining the less significant decimal digit.

| Decimal Digit Represented | Binary Code | | | | | | | | | | | | | | | | | | | |
|---|---|---|---|---|---|---|---|---|---|---|---|---|---|---|---|---|---|---|---|---|
| | Example I | | | | Example II | | | | Example III | | | | Example IV | | | | Example V | | | |
| | W | .X. | Y | Z | W | X | Y | Z | W | X | Y | Z | W | X | Y | Z | W | X | Y | Z |
| 0 | 0 | 0 | 0 | 0 | 0 | 1 | 0 | 1 | 0 | 1 | 1 | 0 | 1 | 0 | 1 | 0 | 1 | 0 | 0 | 1 |
| 1 | 0 | 0 | 0 | 1 | 0 | 0 | 0 | 1 | 0 | 0 | 1 | 0 | 1 | 1 | 1 | 0 | 1 | 0 | 1 | 1 |
| 2 | 0 | 0 | 1 | 1 | 0 | 0 | 1 | 1 | 0 | 0 | 1 | 1 | 1 | 1 | 1 | 1 | 1 | 0 | 1 | 0 |
| 3 | 0 | 0 | 1 | 0 | 0 | 0 | 1 | 0 | 0 | 0 | 0 | 1 | 1 | 1 | 0 | 1 | 1 | 1 | 1 | 0 |
| 4 | 0 | 1 | 1 | 0 | 0 | 1 | 1 | 0 | 0 | 1 | 0 | 1 | 1 | 1 | 0 | 0 | 1 | 1 | 0 | 0 |
| 5 | 1 | 1 | 1 | 0 | 1 | 1 | 1 | 0 | 1 | 1 | 0 | 1 | 0 | 1 | 0 | 0 | 0 | 1 | 0 | 0 |
| 6 | 1 | 0 | 1 | 0 | 1 | 0 | 1 | 0 | 1 | 0 | 0 | 1 | 0 | 1 | 0 | 1 | 0 | 1 | 1 | 0 |
| 7 | 1 | 0 | 1 | 1 | 1 | 0 | 1 | 1 | 1 | 0 | 1 | 1 | 0 | 1 | 1 | 1 | 0 | 0 | 1 | 0 |
| 8 | 1 | 0 | 0 | 1 | 1 | 0 | 0 | 1 | 1 | 0 | 1 | 0 | 0 | 1 | 1 | 0 | 0 | 0 | 1 | 1 |
| 9 | 1 | 0 | 0 | 0 | 1 | 1 | 0 | 1 | 1 | 1 | 1 | 0 | 0 | 0 | 1 | 0 | 0 | 0 | 0 | 1 |

The first binary digit, W, in each of these codes determines whether the decimal digit represented by the remaining digits X, Y and Z of the code is greater than four or less than five. It follows that a decimal digit represented by one of the words of one of these codes may be complemented on nine merely by changing the binary digit W from 0 to 1 or vice versa. The binary digit W is, therefore the complementing binary digit. It will, of course, be understood that the complementing binary digit may occur in any convenient position relative to the other digits (X, Y and Z) of a code and, therefore need not be the first digit.

It will be noted that in each of the above examples, each odd decimal digit is represented by a binary code having an odd number of binary digits 1. This arrangement of binary codes facilitates the decoding of the cyclic permuting binary decimal code in a manner which will be apparent from the following description.

Many other variations of binary codes of a similar nature will occur to those versed in the art. However, the binary code given in Example II will be used for the following description of the embodiments of the invention.

Figure 2:
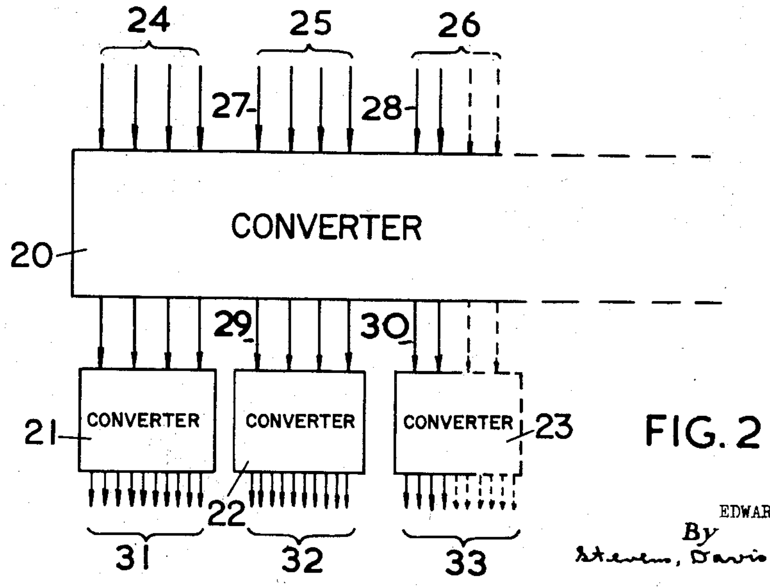
Figure 4:
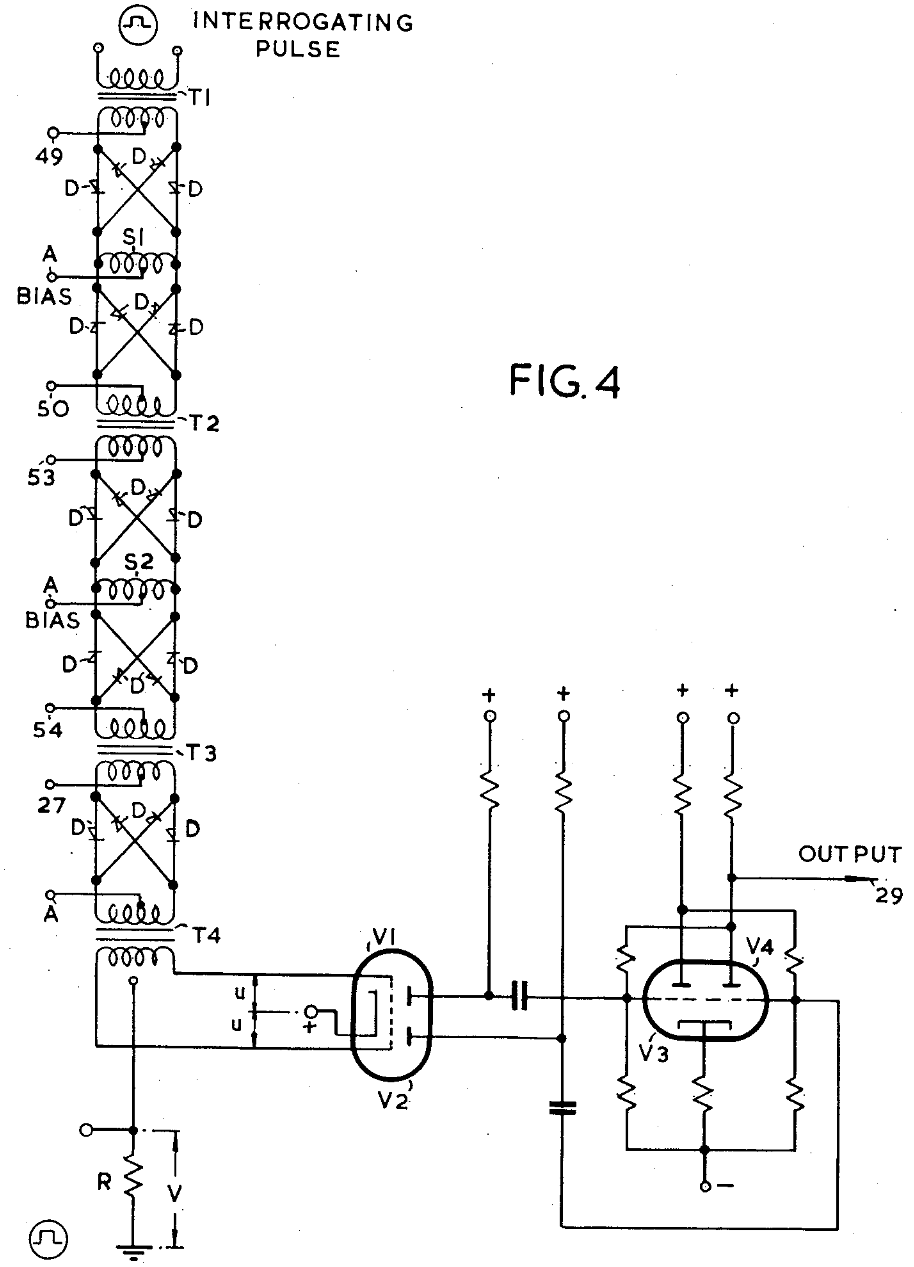
Figure 5:
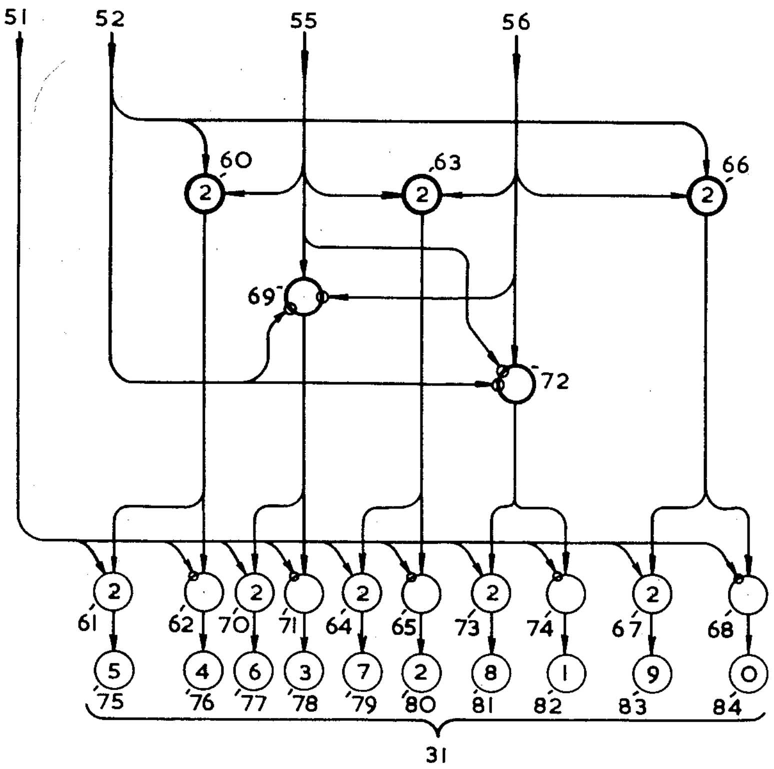

In order that the present invention may be more clearly understood, embodiments thereof will now be described, by way of example, with reference to the accompanying drawings, in which;

Figure 1 is a plan view of a commutator for encoding into digital form the rotational position of a shaft, Figure 2 is a block schematic-diagram of a decoder for converting digital information into decimal form, Figure 3 is a circuit diagram of a part of the decoder illustrated in Figure 2, Figure 4 is a diagram showing in detail a circuit suitable to form a part of the circuit illustrated in Figure 3, Figure 5 is a circuit diagram of a further part of the decoder illustrated in Figure 2, Figures 6(*a*) and 6(*b*) are circuit diagrams of a decoder arranged directly to operate a typewriter, Therefore, along a radial line passing through point X00, the commutator defines the code 0101, 0101, which in the cyclic permuting decimal code, by Example II, represents 00 which, in turn, represents the normal decimal number 00. Along a radial line passing through the point X01, the commutator defines a code 0101, 0001, which represents 01 in the cyclic permuting decimal code (the normal decimal number 01). Along a radial line through the point X99, the commutator defines a code 1101, 0101 which represents 90 in the cyclic permuting decimal code (the normal decimal number 99.) The points X99, X00 and X01 lie in successive sectors of the one-hundred sectors into which the commutator is divided. It will be seen that in this and all other cases the code along a radial line changes by only one binary digit from sector to sector.

The code is read from the commutator by means of eight brushes (not shown) arranged along a radius of the commutator and each adapted to engage with the lands of a separate one of the annular rings. The commutator may be stationary and the brushes arranged to be rotated about the centre of the commutator by means of a shaft (not shown). Alternatively, the brushes may be stationary and the commutator rotated about its centre by means of a shaft. In either case, when the commutator is connected to a voltage source, the brushes will provide an output in parallel mode which is indicative of the rotational position of the shaft. The output from the brushes will be in a cyclic permuting binary-decimal code which may be decoded to yield the degree of rotation of the shaft in normal decimal form to the nearest $\pi/50$ radians in a manner to be described hereinafter.

It will, of course, be understood that the commutator disc 1 shown in Figure 1 is illustrated by way of example only and that similar commutator discs may be constructed to conform to the other cyclic permuting binary codes (for example, those given in Examples I, III, IV and V).

In cases where the binary codes used for expressing decimal digits have some measure of symmetry, one commutator ring in each group of four representing a single decimal digit may be dispensed with by placing two brushes staggered relative to one another on one of the commutator rings. The binary codes given in Examples V, III and II above are examples of binary codes which have a measure of symmetry. Thus in Example V the binary digits X and Z each repeat six noughts and four ones cyclically. In both Examples II and III the Y and Z binary digits repeat four noughts and six ones cyclically.

Thus, in the case of the commutator 1 shown in Figure 1, the commutator rings Y2 and Y6 may be omitted. An output equivalent to that from the ring Y2 may be obtained by placing another brush on the ring Y1 displaced from the normal brush by $5(2N+1)$ sectors where N is an integer such that $0 \leq N \leq 9$. Also, an output equivalent to that from the ring Y6 may be obtained by placing another brush on the ring Y5 diametrically displaced from the normal brush (that is to say, displaced from the normal brush by 50 sectors of the commutator). Alternatively, of course, commutator rings Y1 and Y5 may be omitted and similarly displaced brushes placed on the rings Y2 and Y6.

Furthermore, the commutator disc may comprise a carrier made of any material so treated as to render it suitable for use in conjunction with any particular device chosen for detecting the digits coded on the disc. For example the commutator disc may be made from transparent material the portions of the commutator corresponding to the lands in the copper disc being made opaque. The code at a particular point around the disc may then be obtained in the form of a pulse train by means of a beam of light which scans the commutator disc along a radial path and a photo-electric cell or photo-electric cells arranged to give an output whenever the light penetrates the commutator disc. A succession of pulses may thus be obtained representing the rotational position of a shaft in the cyclic permuting binary-decimal code used.

It is sometimes inconvenient to accommodate all the annular rings necessary to obtain the required degree of accuracy on one commutator disc. In this case two or more discs, suitably geared together, may be used. For instance, each succeeding disc may be driven from an immediately preceding disc (for encoding digits of a lower order of significance) by means of a Geneva stop mechanism. In this case each disc which drives a disc for encoding digits of higher significance should be divided into $2m \times 10^n$ segments, where $m$ and $n$ are integers such that $0<m<5$ and $n>0$. For example, two commutator discs may be used, one disc divided into 2,000 segments and the other disc, driven by the first disc by means of a Geneva stop mechanism, divided into five segments. Five complete rotations of the first disc are arranged to produce one complete rotation of the second disc. The second disc is coded so that the segments represent 0,000, 2,000, 4,000 and so on up to 8,000. This arrangement simulates the effect of having 10,000 segments on a single disc. Continuity is maintained because about the point at which the second disc moves from the representation of 0000 to the representation of 2,000, say, the first disc is yielding an output sequence representing the cyclic permuting decimal digits 1000, 0000 and 0001.

It should be noted that if the first commutator disc were divided into only 1,000 segments, continuity would not be maintained. This follows from the fact that as the second disc moved from the representation of 0,000 to the representation of 1,000 say, the first disc would yield an output sequence representing 900,000,001 whereas the sequence required is 900,900,901.

It will be appreciated that although only disc commutators have been described with reference to Figure 1, linear commutators also marked in a cyclic permuting binary-decimal code may also be made. In this case, for example, lands and depressions may be formed in a line transversely of the linear commutator in a cyclic permuting binary-decimal code in a manner similar to that described with reference to Figure 1. The numbers represented by the code may then themselves represent multiples of a predetermined unit length along the longitudinal axis of the linear commutator.

Figure 2 shows a block schematic diagram of a decoder arranged to operate in the parallel mode for decoding a cyclic permuting binary-decimal code of the preferred type into normal decimal form. The decoder comprises a converter 20 for converting signals representing a normal decimal number in the binary-decimal cyclic permuting code into signals representing, in a cyclic permuting binary code, the actual digits of the corresponding normal decimal number. The decoder also comprises further converters 21, 22 and 23 for converting the cyclic permuting binary digits representing the normal decimal digits as obtained from the converter 20 into normal decimal form.

The operation of the converter 20 depends upon the nature of the cyclic permuting binary code used and also upon the rule, already explained above, for the conversion of the cyclic permuting decimal code into normal decimal form. It will be remembered that odd decimal digits are represented by combinations of an odd number of binary digits. It follows that all the even decimal digits are represented by combinations of even numbers of binary digits. It will be remembered that Examples I to V above illustrate binary codes in which all the odd decimal digits are represented by combinations of odd numbers of binary digits.

Thus, it follows that conversion from the binary-decimal cyclic permuting code representing a normal decimal number to a code in which a cyclic permuting binary code represents the digits of the same number expressed in normal decimal form may be carried out by following a rule similar to that for the conversion of the cyclic permuting decimal code into normal decimal form. The rule is as follows: The digits of the cyclic permuting binary code representing a cyclic permuting decimal digit are altered so as to represent the complement on nine of the decimal digit whenever the total number of digits 1 in the cyclic permuting binary words representing cyclic permuting decimal digits of greater significance is odd.

In order to make this rule clearer, an example will now be taken. Let the digits 492549 in the cyclic permuting decimal code be considered. The digits may be represented in the cyclic permuting binary code of Example II as follows: 0110, 1101, 0011, 1110, 0110, 1101.

This expression represents a number expressed in a cyclic permuting binary-decimal code employing the cyclic permuting decimal code of the preferred type hereinbefore described. If the rule, is followed, this expression may now be changed into another expression representing normal decimal digits in the same cyclic permuting binary code as follows. There are no digits 1 preceding the first binary word comprising first group of binary digits and therefore this group remains unchanged. There are an even number of digits 1 (two in the group 0110) preceding the next group of binary digits so that this group remains unchanged. There is an odd number of digits 1 (five in the groups 0110 and 1101) preceding the next group of binary digits so that this group must be altered to represent the complement on 9 of the decimal digit (2) represented by the group. Thus the group is altered to 1011 by changing the complementing binary digit W (that is to say, the digit 0 in the place W is replaced by the digit 1). There is again an odd number of digits 1 (seven in the groups 0110, 1101 and 0011) preceding the next group of binary digits so that this group must also be altered to represent the complement on 9 of the decimal digit (5) represented by this group. Thus the group is altered to 0110 by changing digit W (that is to say, the digit 1 in the place W is replaced by the digit 0). Even numbers of binary digits (ten and twelve respectively) precede the last two groups of binary digits and, therefore, these two groups remain unchanged.

The new expression is, therefore:

0110, 1101, 1011, 0110, 0110, 1101

This expression represents the normal decimal number 497449. This number is also represented by the digits 492549 in the cyclic permuting decimal code, and these digits are those from which the cyclic permuting binary-decimal code of the present example was originally derived.

In Figure 2 there are shown three groups of input lines 24, 25 and 26 to the converter 20. To each group of input lines there is applied a potential pattern so that each group represents in the cyclic permuting binary code of Example II a digit in the cyclic permuting decimal code. That is to say, all the potentials of the groups define a decimal number in the cyclic permuting binary-decimal code. A positive potential applied to one of the input lines represents the digit 1 and a zero potential applied to one of the lines represents the digit 0. The potentials on the group of input lines 24 represent the most significant cyclic permuting decimal digit, the potentials on the group of input lines 25 represent the next less significant cyclic permuting decimal digit and so on.

In each group of input lines the line on the left-hand side of each group (as shown in the drawing) represents the complementing binary digit W in each group. That is to say that when it is desired to complement on 9 the decimal digit represented by the potentials on the input lines, the potential on the left-hand input line of the group is changed from zero to positive or vice versa. Thus when there is an odd number of input lines which are at a positive potential in the group 24, a positive (or zero) potential in a line 27 in the group 25 will appear as a zero (or positive) potential on a line 29 at the output of the converter 20. However, the potentials, representing the binary digits X, Y and Z, of all the other input lines of the group 25 will appear unaltered at the appropriate output lines of the converter 20. Similarly, when there are odd number input lines which are at a positive potential in the groups 24 and 25 a zero (or positive) potential on an input line 28 will appear as a positive (or zero) potential on a line 30 at the output of the converter 20. However, if there is an even number of input lines which are at a positive potential in the group 24 (or in the groups 24 and 25), the potential on the input line 27 (or on the input line 28) will appear unaltered at the output line 29 (or at the output line 30). The potentials representing the binary digits X, Y and Z, of all other input lines of the groups will in all cases appear unaltered at the appropriate output lines of the converter 20.

Each group of four output lines from the converter 20 is fed to a separate one of the converters 21, 22 and 23. Each of these converters is arranged to energise one of a group of ten output lines according to the combination of potentials applied to its input. Each of the ten output lines represents a separate one of the normal decimal digits 0 to 9. The groups of ten output lines of the converters, 21, 22 and 23 are indicated at 31, 32 and 33. Each output line may be used to energise, for example, a printing mechanism (not shown) or an electrical lamp (not shown) to indicate the normal decimal number represented by the potentials applied in accordance with the cyclic permuting binary decimal code to the inputs of the converter 20.

The chain dotted lines in Figure 2 indicate that the arrangements of the circuits in the converter 20 and the number of converters similar to the converters 21, 22 and 23 depend upon the number of normal decimal digits which can be accommodated by the encoder.

Figure 3 shows a circuit diagram of the converter 20 shown in Figure 2. The notation used in Figure 3, and also, where applicable in Figures 5 and 7 is the same as that set forth in United States Patent No. 2,686,632, granted August 17, 1954. The figure shows a series of eight not-equivalent gates 40 to 47. The action of each of these not-equivalent gates is that, if the two inputs to the gate are the same, no output is obtained therefrom but if the two inputs differ, an output is obtained from the gate. In the case of the circuit of Figure 3, as in the case of the decoder shown in Figure 2, the inputs will be considered as either a positive potential representing the binary digit 1 or zero potential representing the binary digit 0.

The not-equivalent gate 40 has two input lines 49 and 50 representing the digits W and X, respectively, of the binary word representing the most significant cyclic permuting decimal digit. These two inputs are also passed to two output lines 51 and 52 of the converter. The output of each of the gates 40 to 46 is connected to the next gate in the series of gates. The input lines 53 and 54 to the gates 41 and 42 form, together with the input lines 49 and 50, the group of input lines 24 of Figure 2. The output lines 51, 52, 55 and 56 form the corresponding group of output lines in Figure 2.

Similarly input lines 27, 57, 58 and 59 form the second group of input lines 25 shown in Figure 2 and the input line 27 is the first input line, representing the binary digit W, in the group 25 of Figure 2. The output lines 29, 60, 61 and 62 form the group of output lines corresponding to the group of input lines 25 in Figure 2 and the output line 30 is the same line as the output line 30 shown in Figure 2. If positive potentials are applied to an odd number of the input lines 49, 50, 53 and 54 a positive potential will be obtained from the output of the gate 42, but not otherwise. Thus when positive potentials are applied to an odd number of the input lines 49, 50, 53 and 54 the digit represented by the potential on the input line 27 will appear changed at the output line 29 of the gate 46. Similarly the digit represented by the potential on the input line 28 will appear changed at the output line 30 when, and only when, positive potentials are applied to an odd number of the input lines 49, 50, 53, 54, 27, 57, 58 and 59. This is the condition required by the rule for code conversion.

An example will now be taken in order to illustrate the operation of the circuit of Figure 3. Let there be considered the expression 1011, 1110, 0 . . . representing the cyclic permuting decimal digits 7, 5(<5) and, indirectly, the normal decimal number 7, 4 (<5). Here the notation (<5) means some decimal digit less than 5. This expression is represented by a positive potential applied to each of the input lines 49, 53, 54, 27, 57 and 58 and a zero potential applied to each of the input lines 50, 59 and 28. The two potentials applied to the gate 40 are, therefore, not the same. Thus a positive potential output will be obtained for the gate 40 and will be applied to one input of the gate 41. Because the other input to the gate 41 is also a positive potential, no output will be obtained from this gate. An output will, however, be obtained from the gate 42 because the two inputs are not the same. This output is applied to the gate 46 together with the positive potential from the input line 27. Therefore, a zero potential will appear on the output line 29. If the similar processes which occur in relation to the gates 45, 44, 43 and 47 are followed, it will be seen that a zero potential will appear at the output 30.

It follows that a positive potential will appear on each of the output lines 51, 55, 56, 60 and 61 and a zero potential will appear on each of the output lines 52, 29, 62 and 30. These potentials represent the binary digits 1011, 0110, 0 . . . which, in turn, directly represent the normal decimal number, 7, 4(<5).

Figure 4 is a circuit diagram of a circuit which may be used to act as a group of four not-equivalent gates in the circuit shown in Figure 3. For example, the circuit shown in Figure 4 may be used to produce the effect of the four not-equivalent gates 40, 41, 42 and 46 or the effect of the four not-equivalent gates 43, 44, 45 and 47. Alternatively by means of a suitable time-multiplex arrangement, the circuit shown in Figure 4 may be used to produce in time sequence the effect of several groups of four not-equivalent gates.

The basic principle on which the circuit shown in Figure 4 operates is disclosed in the complete specification of U.K. Patent No. 701,851.

Figure 4 shows four pulse transformers T1, T2, T3 and T4 and two centre-tapped inductances S1 and S3 interconnected by groups of rectifiers D so as to form five ring modulators in cascade. The input lines 49, 50, 53, 54 and 27 correspond to the input lines bearing the same reference numerals in Figure 3. To each of these input lines there is applied either zero potential (corresponding to the binary digit 0) or a positive potential of P volts (corresponding to the binary digit 1). The lines A are biased to such a potential that the current through a group of rectifiers D in a ring modulator reverses when an associated input voltage on an input line, such as the line 49, changes from zero volts to P volts. When it is desired to make a conversion, a short positive-going pulse is applied to the input of the transformer T1. This pulse appears as either a positive-going pulse or as a negative-going pulse at the inductance S1 depending upon which pair of the group of rectifiers D in the first ring modulator is rendered conducting by the potential on the input line 49. The pulse appears at the output of the transformer T2 again inverted or not depending upon the potential on the input line 50 and so on.

Thus, a positive-going pulse, or a negative-going pulse will appear at the output of the transformer T4 depending upon whether there is an even number of digits 1 or an odd number of digits 1 represented by the potentials applied to the input lines 49, 50, 53, 54 and 27. This pulse of amplitude 2 U volts, say, is applied to the control grid of the valves V1 and V2. At the same time as the interrogating pulse is applied to the input of the transformer T1 a positive-going pulse of amplitude V volts is applied across a resistor R to a centre-tap on the output winding of the transformer T4. Therefore, with respect to earth, the voltages at the two ends of the secondary winding of the transformer T4 are $(V+U)$ and $(V-U)$.

The circuit is so arranged that the triode V1 or the triode V2 conducts only when its input voltage exceeds V. Thus, if V exceeds the value of any spurious output signals due to unbalance, only the wanted positive-going pulse having an amplitude exceeding the voltage V can produce anode current in the valve V1 or the valve V2.

The anodes of the valve V1 and V2 are coupled to an output trigger pair of valves V3 and V4 as shown. The trigger pair operate so that either the valve V3 or the valve V4 conducts according to the polarity of the pulse output of the transformer T4. The voltages applied to the anode loads and to the common cathode of the valves V3 and V4 are such that when the valve V4 is conducting the voltage at the output line 29 is P volts and when the valve V3 is conducting, the voltage at the output line 29 is zero volts. It is further arranged that the valve V4 conducts to give an output of P volts when the inputs to the lines 49, 50, 53, 54 and 27 represent an odd number of binary digits 1 and the valve V3 conducts to give an output of zero volts when those inputs represent an even number of digits 1.

The output 29 may be passed to an input line (similar to the input line 49) of a further set of transformers which are pulsed by an interrogating pulse at a time just after the interrogating pulse applied to the transformer T1. Alternatively, the output at the line 29 may be staticised (by means, for example, of a trigger) and the circuit of Figure 4 used in time multiplex for a second group of inputs (for example, a group representing the next less significance cyclic permuting decimal digit and the staticised output of the line 29) and so on.

Figure 5 shows a logical circuit diagram of a converter such as the converter 21 of Figure 2. It will be remembered that such a converter converts a code representing a normal decimal number in cyclic permuting binary form in to a direct indication of the normal decimal number. The group of input lines 51, 52, 55 and 56 is a continuation of the group of output lines bearing the same reference numerals in Figure 3. That is to say, the input lines correspond to the input lines to the converter 21 in Figure 2.

The input lines 52 and 55 are connected to an and gate 60 so that this gate will pass a positive potential to an and gate 61 and an inhibiting gate 62 only when a positive potential is applied to both of the input lines 52 and 55. The input lines 55 and 56 are also connected to an and gate 63 the output of which is connected in a similar manner to two gates 64 and 65. Similarly, the input lines 52 and 56 are connected to an and gate 66 the output of which is connected to two gates 67 and 68. The input line 55 is connected to an inhibiting gate 69 so that a positive potential from the input line 55 will pass to two gates 70 and 71 except when there is a positive potential on either of the input lines 52 and 56. Similarly the input line 56 is connected to an inhibiting gate 72 so that a positive potential from the input line 56 will pass to two gates 73 and 74 except when there is a positive potential on either of the input lines 52 and 55. The input line 51 is connected to the and gates 61, 70, 64, 73 and 67 and to the inhibiting inputs of the inhibiting gates 62, 71, 65, 74 and 68. The gates 61, 62, 70, 71, 64, 65, 73, 74, 67 and 68 are connected at their outputs to lamps 75 to 84 respectively. These lamps, when energised, are arranged to illuminate drawings of the decimal digits 5, 4, 6, 3, 7, 2, 8, 1, 9 and 0 respectively.

A example will serve to make the operation of the circuit of Figure 5 more clear. Let the case be considered in which positive potentials are applied to the input lines 51, 52, and 55 and a zero potential is applied to the input line 56. Positive potentials will be applied to the and gate 60 and through this gate to the gates 61 and 62. The gate 61 will be opened and the gate 62 closed by the positive potential on the input line 51 and the lamp 75 will be lit, indicating the normal decimal digit 5. The circuit of Figure 5 has thus decoded the binary digits 1110 as the decimal digit 5 in accordance with the code of Example II. It will be noted that the positive potential on the input line 55 is prevented from reaching the gates 70 and 71 because the gate 69 is closed by the positive potential on the input line 52.

It will be found that the circuit of Figure 5 will convert any combination of potentials set up in accordance with the code of Example II on the input lines into a potential on a single output line which represents a decimal digit represented by the combination.

Figure 6($a$) and 6($b$) are diagrams of parts of a relay circuit for decoding a cyclic permuting binary-decimal code representing a decimal number and for energising the solenoids of an electrical typewriter so as to print the normal decimal number so represented. Figure 6($a$)

shows four relays A/2, B/5, C/3 and D/3. The relay contacts are shown in the "non-operated" position. The relays are actuated by voltages applied to input lines 110, 111, 112 and 113 respectively. To the input lines 110 to 113 there are applied voltages according to a binary word comprising one group of four cyclic permuting binary digits (in the code of Example II) representing a single cyclic permuting decimal digit. For example, if the cyclic permuting decimal digit represented was 9, then a positive voltage would be applied to each of the lines 110, 111 and 113 and a zero voltage would be applied to line 112.

Two lines 114 and 115 are connected to the change over contacts A1 and A2 respectively of the relay A/2. The lines 114 and 115 are connected to the outputs of a similar set or similar sets of relay changeover contacts (not shown) which are associated with further relays (not shown). These relays and changeover contacts are similarly arranged so that when the total number of digits 1 representing cyclic permuting decimal digits of higher significance is even the line 114 is earthed and when this number of digits 1 is odd the line 115 is earthed. It follows that the line 116 will be earthed either if the line 114 is earthed and the relay A/2 is not energised or if the line 115 is earthed and the relay A/2 is energised. Also the line 117 will be earthed either if the line 114 is earthed and the relay A/2 is energised or if the line 115 is earthed and the relay A/2 is not energised. A similar process takes place with the relay contacts B1 and B2, C1 and C2 and D1 and D2 so that an output line 118 will be earthed if the total number of preceding digits 1 represented by all the input voltages (now including the voltages applied to the input lines 110 to 113) is even and an output line 119 will be earthed if the total number of preceding digits 1 is odd. The output lines 118 and 119 are connected to two input lines (not shown), similar to the lines 114 and 115, of the next set of relay changeover contacts belonging to the set of four relays for decoding the next less significant group of four cyclic permuting binary digits. Of course, in the case of the set of four relays for decoding the least significant group of four cyclic permuting binary digits, the relay changeover contacts corresponding to the contacts B1, B2, C1, C2, D1 and D2 are not required.

One changeover contact of each relay and the lines such as the lines 114, 116 and 118 form one channel and the other changeover contact and the lines such as the lines 115, 117 and 119 form another channel from which may be determined at appropriate output points (such as the lines 116 and 117) whether the complementing binary digit representing the normal (decoded) decimal digit is a digit 0 or a digit 1.

It will be seen from this description that the relay contacts A1 and A2, B1 and B2 etc., act in a similar manner to the not-equivalent gates shown in Figure 3. For instance, if the line 115 is earthed indicating an odd number of preceding digits 1 and there is no input to the line 110, the line 117 will be earthed. The earthing of the line 117 is, in fact, equivalent to an output obtained from a not-equivalent gate such as that shown at 46 in Figure 3. Such an output is indicative that the decimal digit is greater than 4. The line 117 is connected to a contact on a uniselector level 120. Uniselectors are well-known devices and are described in volume 2 of the book entitled "Telephony" by J. Atkinson, published in 1950 by Sir Isaac Pitman and Sons Ltd. of London, England. An eight-level uniselector is shown in, and described with reference to Figure 83 on page 88 of the afore-mentioned book. The wiper contact 121 of the uniselector level 120 is connected to all the solenoids of a typewriter which, when operated, cause the typewriter to print the decimal digits greater than 4. The solenoid for printing the digit 6 is shown at 122 and the output lines to the solenoids (not shown) for printing the digits 5, 7, 8 and 9 are shown at 123, 124, 125 and 126 respectively.

Similarly, the earthing of the line 116 is equivalent to no output being obtained from a not-equivalent gate such as that shown at 46 in Figure 3. Since this indicates that the decimal digit represented by the binary digits is less than 5, the line 116 is connected to all the solenoids for printing the decimal digit less than 4. The connection is made through a contact of a uniselector level 127 and a wiper contact 128 of the uniselector level 127. The solenoid for printing the decimal digit 3 is shown at 129 and the output lines to the solenoids (not shown) for printing the digits 0, 1, 2 and 4 are shown at 130, 131, 132 and 133 respectively.

The relay B/5 has three contacts B3, B4 and B5, the relay C/3 has a contact C3 and the relay D/3 has a contact D3 which are so inter-connected as to decode the remaining three cyclic permuting digits (X, Y and Z respectively) represented by the pattern of potentials applied to these three relays. A positive voltage is applied to the moving contact D3 via a uniselector level 134 so that the positive potential is applied to the moving contact B3 if the relay D/3 is not operated or to the moving contact C3 if the relay D/3 is operated and so on.

The contact B3 yields two output lines 135 and 136. The output line 135 (a positive voltage on which represents the digit 3 or the digit 6) is connected to the typewriter solenoids 122 and 129. The output 136 is connected in a similar manner to two solenoids (not shown) for printing the digits 4 and 5. The contact B4 yields two further output lines 137 and 138. The output line 137 is connected to two solenoids (not shown) for printing the digits 1 and 8 and the output line 138 is connected to two solenoids (not shown) for printing the digits 0 and 9. The contact B5 yields two output lines 139 and 142. The output line 139 is connected to two solenoids (not shown) for printing the digits 2 and 7. The output line 142 is connected to a lamp 143 which is thus arranged to light when all of the relays 111, 112 and 113 are energised. This serves as a warning that the input code is in error. This follows from the fact that the last three digits cannot all be 1's in the code of Example II.

The wiper contacts of the uniselector levels 120, 127 and 134 are ganged together and are arranged to interconnect in sequence the contacts of separate groups of relays similar to the group A/2, B/5, C/3, and D/3 shown in the figure so that the typewriter prints firstly the most significant decimal digit, secondly the next less significant decimal digit, and so on.

The operation of the circuit of Figure 6(*a*) will be further explained with the aid of an example. Let it be assumed that the total number of binary digits 1 in the groups of binary digits preceding in significance the group to be decoded by the relays shown in the figure is odd and also that the group of digits to be decoded is 1010. Then positive voltages will be applied to the input lines 110 and 112 and zero voltages will be applied to the input lines 111 and 113. Also the line 115 will be earthed and the line 114 will not be earthed. The relays A/2 and C/3 will be operated and the relays B/5 and D/3 will not be operated. Because the relay 110 is operated, the line 116 will be earthed and the solenoid 129 will be earthed at one end thereof via the uniselector level 127. Since neither of the relays B/5 and C/3 are operated a positive voltage will be applied to the line 135 via the relay contacts B3 and D3 and the uniselector level 134. This positive voltage will be applied to the solenoid 129 so that current will flow through it to earth. The typewriter will, therefore, print the decimal digit 3. By studying the effect of applying various patterns of voltages to the input lines 110 to 113 and of earthing either the line 114 or the line 115, the reader may verify that the circuit shown in Figure 6(*a*) will convert any group of binary digits given in Example II to the corresponding normal decimal digit.

The contacts of the first relay of the group of relays for decoding the binary word comprising the most significant group of binary digits are not required to be of the form shown at A1 and A2 in Figure 6(*a*). The arrangement of contacts required is shown in Figure 6(*b*). This figure shows a relay E/1 having a moving contact E1 which is connected to earth. The relay contact yields two output lines 140 and 141 which are similar to the output lines 116 and 117 of the contacts of the relay A/2 in Figure 6(*a*). Thus the line 140 is earthed when the relay E/1 is not energised and the line 141 is earthed when the relay E/1 is energised.

A further facility of complementing the output of the decoder on nines may be obtained by providing a second, differential, winding on the relay E/1. If this winding is energised so as to oppose the other winding when energised, the action of the relay E/1 will be reversed, having the effect of complementing the outputs from the decoder on nines.

Figures 6A, 6B:
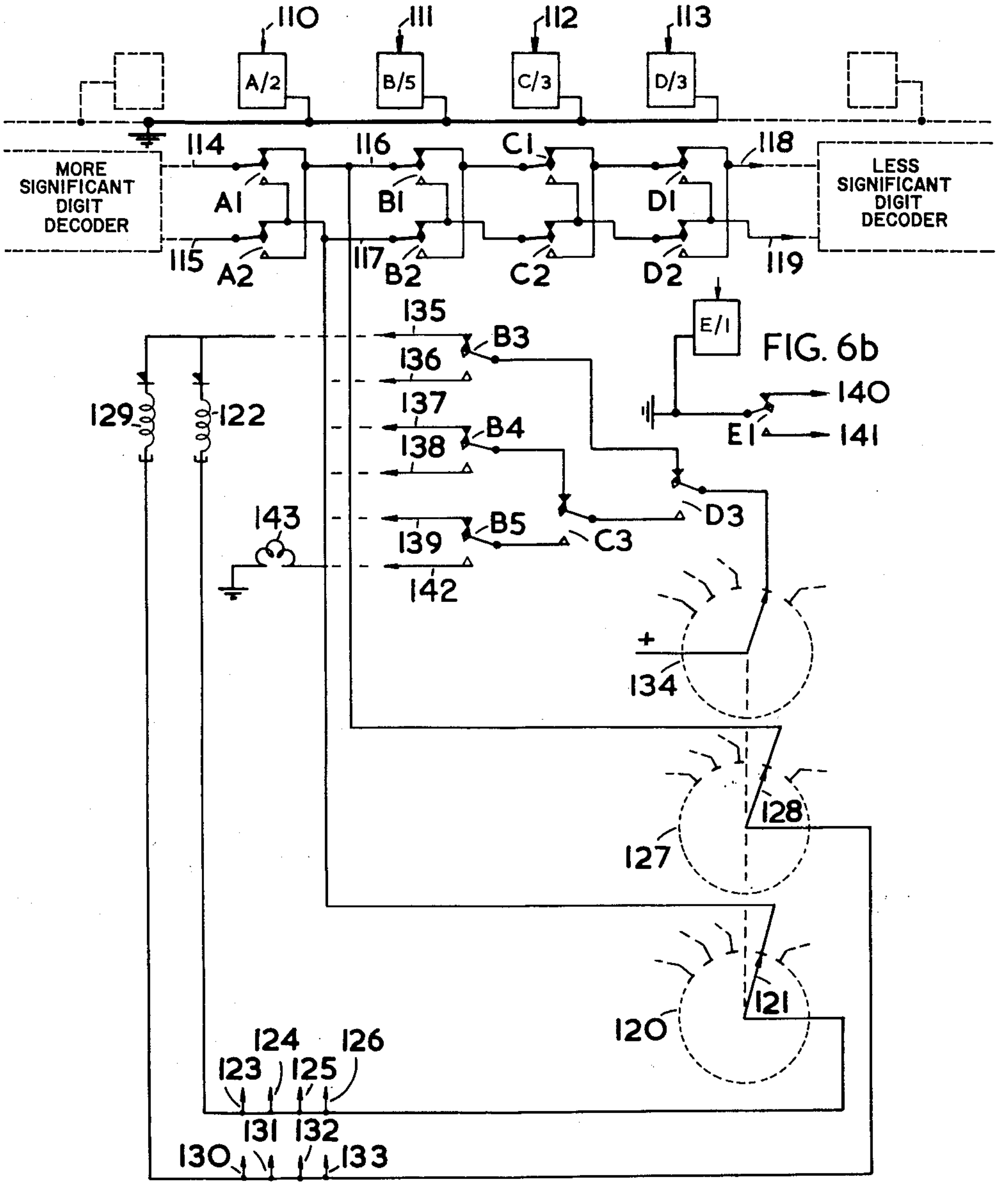

A differential winding on the relay E/1 may be used for another purpose. Suppose, for example, that it is desired to use a commutator normally reading from 0 to 999 to read from −499 to −000 and from 000 to 499. By altering the decoder, the commutator may be made to appear to read −000 at the 500th sector and +000 at the 499th sector or vice versa. The alteration to the decoder described with reference to Figures 6*a* and 6*b* is very simple. Firstly, the W binary digit output representing the most significant cyclic permuting decimal digit in the commutator output is disconnected from the relay E/1 and is taken to a separate output to indicate a negative number if a digit 1 and a positive number if a digit 0 or vice versa. The differential winding on the relay E/1 is permanently energised. The connections from the uniselector levels 120 and 127 to the lines 140 and 141 of Figure 6*b* are reversed. Also, the connections to the typewriter solenoids from the relay contacts, similar to the relay contacts B3, B4 and B5, in the first group of relays are rearranged so that typewriter will type out digits which are the complements on fours of what it would normally type. For instance, an output line corresponding to the output line 137 from the relay contact B4 would be connected to the solenoids 122 and 129 so that a positive voltage appearing on this line will cause the decimal digit 3 to be printed on the typewriter (instead of the normal decimal digit 1). The interconnections of the decoder associated with the groups of relays concerned with decoding the binary digits representing decimal digits of less significance than the most significant decimal digit remain unchanged.

An example will serve to illustrate the action of the modified decoder. Suppose the output from a commutator were 0010, 1011, 0110 representing 374 in the cyclic permuting decimal code and the normal decimal number 324. On being fed to the decoder, the W binary digit 0 in the first group of binary digits would represent a positive or negative sign according to the convention used. A positive voltage is applied to the differential winding of the relay E/1, but because the connections of the levels 120 and 127 of the uniselector to the lines 140 and 141 of Figure 6(*b*) are reversed the first group of binary digits will still be printed as decimal digit less than five. Also the line in the first group of relays corresponding to the line 135 in Figure 6(*a*) will be energized. Thus, as hereinbefore explained, the decimal digit 1 will be printed (the decimal digit 1 being the complement on four of the decimal digit 3 which would normally be printed). Further, since the relay E/1 is energised, the remaining digits will be printed as the complements on nines of the digits which would normally be printed and thus will be printed as 75. The decimal number printed will, therefore, be 175 having a sign according to the convention used.

Similar modifications directed to the same ends may be applied to the embodiments described with reference to Figures 3 and 5 and Figure 4.

Figure 7 shows a logical diagram of a circuit for converting the representation of a decimal number in the cyclic permuting binary-decimal code, presented to the circuit in the form of a series of pulses, into a representation of the same number in which normal decimal digits are represented in the cyclic permuting binary code. The circuit comprises a trigger 90, a not-equivalent gate 91, and gates 92 and 93, delay units 94, 95 and 96, a pulse generator 97, and pulse frequency divider circuits 98 and 99.

The operation of the circuit of Figure 7 is as follows. A pulse train comprising a succession of pulses representing a number in the cyclic permuting binary-decimal code is applied to an input line 100 and thence to the gate 93. The digit 1 is indicated by the presence of a pulse in a pulse train and the digit 0 is indicated by the absence of a pulse at a specified time in the pulse train. That is to say that in a pulse train there are specified times equally spaced apart in time at which a pulse may, or may not, appear according to whether the digit of a sequence of digits represented at a specified time is a 1 or a 0. The order of presentation of the digits so represented is as follows. Firstly, the complementing binary digit W of the group representing the most significant cyclic permuting decimal digit is presented, then the digits X, Y and Z of the group representing the same cyclic permuting decimal digit are presented, next the digit W of the group representing the next less significant cyclic permuting decimal digit is presented, and so on. The pulse generator 97 is arranged to generate a sequence of pulses at regular intervals synchronously with all the specified times at which pulses may, or may not, be applied to the input line 100. Therefore, all the pulses applied to the gate 93 are passed to a changeover input of the trigger 90 and to the not-equivalent gate 91.

The width of the pulse from the pulse generator 97 is, as is usual with most clock-pulse generators, one-third of the interval between the start of one pulse and the start of the next pulse. The output pulses from the pulse frequency dividers 98 and 99 have a similar width.

Now the pulse generator output is also connected to the pulse frequency divider circuit 98 which is arranged to provide a pulse output every fourth pulse from the pulse generator 97. This output pulse is applied to the gate 92 via the delay unit 94 which is arranged to introduce a delay equal to the interval between specified times. The output of the trigger 90 is applied to the gate 92 via the delay unit 95. The delay units 95 and 96 both introduce delays of half the intervals between specified times. The output pulse from the pulse frequency divider circuit 98 is also applied to the pulse frequency divider circuit 99 which is arranged to give a pulse output every third pulse from the pulse frequency divider circuit 98. The output pulse from the pulse frequency divider circuit 99 is applied through the delay unit 96 to put the trigger 90 off, if not already off.

The circuit of Figure 7 is arranged to convert a serial pulse representation of a three digit cyclic permuting decimal code each digit of which is represented by four digits of the cyclic permuting binary code set forth in Example II into a serial pulse representation of the equivalent pure decimal number each digit of which is represented in the same binary code.

Figure 8 is a series of graphical waveforms which illustrate further the function of the circuit of Figure 7. Figure 8(*a*) shows a series of pulses obtained from the output of the pulse generator 97. Figure 8(*b*) shows the output of the pulse frequency divider 98 as a pulse generated at every fourth pulse from the pulse generator 97. Figure 8(*c*) shows the pulse output of the pulse frequency divider 99 as a pulse generated at every third pulse from the pulse frequency divider 98. Figure 8(*d*) shows the pulse output from the pulse frequency divider 99 delayed one half pulse interval by the delay unit 96.

Figure 8(*e*) shows the pulse output from the pulse frequency divider 98 delayed one pulse interval by the delay unit 94. The gate 92 is, therefore, open for the time these pulses are applied to it.

Figure 8(*f*) shows, by way of example, a series of input pulses applied to the gate 93. These pulses represent, in the cyclic permuting binary-decimal code employing the binary code of Example II, the three decimal numbers 737, 735 and 724. The pulses represent the cyclic permuting binary-decimal digits 1011, 1010, 0011: 1011, 1010, 0110: 1011, 1011, 0110. The full vertical lines in the figures divide the sequence of digit pulses into complete cyclic permuting binary-decimal words and the dotted vertical lines divide the sequence of digit pulses into the binary words of four digits each which make up the cyclic permuting binary-decimal words. Figure 8(*g*) shows the resultant output of the trigger 90. It will be seen that in addition to the state of the trigger 90 being changed by the front edge of the input pulses shown in Figure 8(*f*), the trigger 90 is also put off by the front edge of the pulses, shown in Figure 8(*d*), from the delay unit 96. Figure 8(*h*) shows the output of the trigger 90 delayed one half of a pulse interval by the delay unit 95.

The output of the delay unit 95 (as shown in Figure 8(*h*), is applied to the gate 92 which is opened by the pulses shown in Figure 8(*e*). The output of the gate will, therefore, be as shown in Figure 8(*i*). These pulses are applied, together with the input pulses shown in Figure 8(*f*), to the not-equivalent gate 91 which gives an output only when a pulse in one set of pulses is present and a pulse in the other set of pulses is not present. The output from the not-equivalent gate 91 is, therefore, a series of pulses as shown in Figure 8(*j*). The pulses represent the cyclic permuting binary-decimal digits 1011, 0010, 1011: 1011, 0010, 1110: 1011, 0011, 0110 which, in turn represents the normal decimal numbers 737, 735 and 724.

It will be seen from Figures 8(*d*) and 8(*h*) that when the last binary digit in a cyclic permuting binary-decimal word is a digit 1, the trigger 90 is put off by a pulse from the delay unit 96 only just in time to prevent an unwanted pulse being transmitted through the gate 92 at the beginning of the next cyclic permuting binary-decimal word. Adjustment of the circuit is, therefore, somewhat critical. This difficulty may be obviated by inhibiting the gate 92 for an interval of time equal to, say, twice the interval of time between digits, immediately after the production of a pulse from the pulse frequency divider 99. In order to do this, an output may be taken from the pulse frequency divider circuit to a flip-flop circuit the output of which is taken to an inhibiting connection of the gate 92 so that when the flip-flop circuit is in its active condition the gate 92 is closed. The flip-flop is activated by the pulses from the divider circuit 99 and is arranged to return to its quiescent condition to allow the gate 92 to open before the next pulse output from the delay unit 94.

The pulse frequency dividers 98 and 99 may comprise ring counters driven by the pulse generator 97 and the pulse frequency divider 98 respectively. In practice a cynchronising signal must be produced by the source of the digit pulses with which to synchronise the pulse frequency dividers so that they are cleared and ready to begin counting pulses at the first and fourth specified times respectively in a cyclic permuting binary-decimal number. Such synchronisation may be carried out by either a separate synchronising signal transmitted to the divider via a separate channel or alternatively by means of a periodic synchronising signal transmitted to the decoder in time multiplex with the digit pulses. The same synchronising signal may be used periodically to synchronise the pulse generating 97 with the digit pulses.

Conversion from a series of pulses representing cyclic permuting binary digits to, say, potentials on lines which represent the equivalent normal decimal digits may be made by means of a simple staticiser circuit comprising, for example, a series of trigger circuits to which the pulses are routed by means of gates controlled by a ring counter.

Although the foregoing embodiments of the invention have been described with reference to only Example II of the given examples of cyclic permuting binary codes, it will be understood that the invention is by no means limited thereby. It will be clear to those versed in the art that minor modifications to the embodiments described will enable them to deal with the other examples of cyclic permuting binary codes given. Indeed, other cyclic permuting binary codes which may be used with modified forms of embodiments described will doubtlessly occur to the reader.

I claim:

1. A digital decoder for converting into normal decimal form a cyclic permuting binary-decimal code wherein a binary word representing a digit in the cyclic permuting decimal code of the preferred type described is the same, except for a complementing binary digit, as the binary word representing the cyclic permuting decimal digit's complement on nine and comprising gating means for examining the binary words representing the cyclic permuting decimal digits and for changing the complementing binary digit of the binary word representing a cyclic permuting decimal digit when, and only when, the normal decimal digit of next greater significance than the cyclic permuting decimal digit is odd, and means connected to the output of said gating means for decoding the resulting binary word into its normal decimal equivalent.

2. A digital decoder as claimed in claim 1 for converting into normal decimal form a cyclic permuting binary-decimal code wherein the cyclic permuting binary code is such that an odd number of binary digits 1 represents an odd decimal digit and comprising gating means for examining the binary words representing the cyclic permuting decimal digits and for changing the complementing binary digit representing a cyclic permuting decimal digit when, and only when, the total number of binary digits 1 in the cyclic permuting binary words representing cyclic permuting decimal digits of higher orders of significance is odd.

3. A digital decoder as claimed in claim 2 and wherein said gating means comprises a not-equivalent gate of a plurality of series-connected not-equivalent gates the first of which is arranged to be fed with voltages representative of the first two binary digits of the word representing the most significant cyclic permuting decimal digit, the last of which is arranged to be fed with a voltage representative of the said complementing binary digit and the remainder of which are each arranged to be fed with a voltage representative of one of the remaining binary digits representing cyclic permuting decimal digits of higher orders of significance.

4. A digital decoder as claimed in claim 2 and wherein said gating means comprises a plurality of relays each arranged to receive a voltage representing a binary digit of binary words representing cyclic permuting decimal digits of greater significance than the said cyclic permuting decimal digit, and a relay arranged to receive a voltage representing the said complementing binary digit, the contacts of the relays including change-over contacts which are connected in series so as to form two channels an output on one of which indicates a digit 1 and an output on the other of which indicates a digit 0.

5. A digital decoder as claimed in claim 2 and comprising a trigger, means for feeding to a changeover input of the trigger a train of pulses representing serially a number expressed in the cyclic permuting binary-decimal code with the digits thereof arranged in a decreasing order of significance, means for putting the trigger off before the reception of such a train of pulses by the trigger, a not-equivalent gate, means for feeding the train of pulses to the not-equivalent gate, delay means for storing the output of the trigger so that at each possible time of receipt of a digit pulse an output from the delay means is present if an odd number of digit pulses has previously been received and means for applying the output from the delay means to the not-equivalent gate during times when a complementing digit pulse may be fed thereto.

6. A digital decoder as claimed in claim 3 and wherein the plurality of not-equivalent gates comprises a plurality of ring modulators and means for applying interrogating pulses thereto.

7. A digital decoder as claimed in claim 3 and wherein the means for converting the signals representing the resulting binary word into its normal decimal equivalent comprises gating means for converting signals representing binary digits other than the complementing binary digit in the binary word into a signal on one of five lines so as to represent one of the five pairs of decimal digits 0 and 9, 1 and 8, 2 and 7, 3 and 6 and 4 and 5, respectively, ten output lines, an output signal on each separate one of which represents a separate one of the digits 0 to 9, and additional gating means for connecting each of the said five lines to a separate one of two of the ten output lines, and means for applying a signal representing the complementing binary digit, changed if necessary, to the said additional gating means.

8. A digital decoder as claimed in claim 4 and wherein the said means for decoding the resulting binary word into its normal decimal form comprises means for converting signals representing the binary digits other than the complementing binary digit in each binary word representing a cyclic permuting decimal digit into an output signal on one of five output lines so as to represent either one of the decimal digits 0 to 4 or the complement on nine of one of those digits.

9. A digital decoder as claimed in claim 4 and wherein the relay arranged to receive a voltage representing the complementing binary digit of the binary word representing the most significant decimal digit has a differential winding and wherein means are provided for energising the differential winding to complement on nines the output of the decoder.

10. A digital decoder as claimed in claim 8 and wherein there is provided means for connecting each of the five output lines to a separate two of ten indicators and means for energising one or the other of the indicators when a signal is present in the output channel according to whether the corresponding complementing binary digit, changed if necessary, in a binary word is a 1 or a 0, so that the energised indicator represents a predetermined one of the decimal digits 0 to 9.

11. A digital decoder as claimed in claim 8 and wherein the means for converting signals representing binary digits other than the complementing binary digits in each binary word into an output or one of five output lines comprises a network of further relay contacts associated with the relays which are arranged each to receive a voltage representing a binary digit other than complementing binary digit in a binary word.

12. A digital decoder as claimed in claim 11 and comprising two uniselector levels each having fixed contacts connected to points on a separate one of the two channels formed by the relay change-over contacts in order to sense whether a decimal digit represented by a binary word is greater than four or less than five, five indicators connected one between each of the five output lines and the moving contact of one uniselector level and a further five indicators connected one between each of the five output lines and the moving contact of the other uniselector level.

13. A digital decoder as claimed in claim 12 and wherein there are provided a third uniselector level, a voltage source connected to the moving contact of the third uniselector level and means for connecting the fixed contacts of the third uniselector level one to each said network of the further relay contacts.

14. A digital encoder comprising a carrier having a plurality of regions marked in accordance with a cyclic permuting binary-decimal code in which the digits 0 to 9 of a cyclic permuting decimal code are represented in a binary code which is cyclic permuting at least for each unit change in the decimal digits 0 to 9 and from 9 directly to 0, and sensing means contacting the regions of said carrier to provide an output indicative of the position of said carrier relative to said sensing means in the said cyclic permuting binary-decimal code.

15. A digital encoder as claimed in claim 14 and wherein said carrier comprises a conductive disc along radial lines on at least one surface of which said regions are formed as lands and depressions, said depressions being filled with non-conductive material, and wherein said reading means comprises a plurality of brushes arranged to bear on the said regions each along a separate circular path.

16. A digital encoder comprising a carrier having a plurality of regions marked in accordance with a cyclic permuting binary-decimal code in which the digits 0 to 9 of the cyclic permuting decimal code of the preferred type described are represented in a binary code which is cyclic permuting at least for each unit change in the decimal digits 0 to 9 and from 9 directly to 0, and sensing means contacting the regions of said carrier to provide an output indicative of the position of said carrier relative to said sensing means in the said cyclic permuting binary-decimal code.

17. A digital encoder comprising a carrier having a plurality of regions marked in accordance with a cyclic permuting binary-decimal code in which the digits 0 to 9 of the cyclic permuting decimal code of the preferred type described are represented in a binary code which is cyclic permuting at least for the decimal digits 0 to 9, a binary word representing a decimal digit in the binary code differing from a binary word representing that decimal digit's complement on nine by a change of one binary digit and an odd cyclic permuting-decimal digit being represented by an odd number of binary digits 1, and sensing means contacting the regions of said carrier to provide an output indicative of the position of said carrier relative to said sensing means in the said cyclic permuting binary-decimal code.

18. A digital encoder as claimed in claim 17 and wherein the carrier comprises a conductive plate along parallel lines on one surface of which the said regions are marked as lands and depressions, the depressions being filled with a non-conductive material.

19. A digital encoder comprising a carrier effectively divided into 10 $n$ segments each having a plurality of regions each characteristic of one of the binary digits 0 and 1 and a sensing device having a plurality of sensing means contacting the regions of said carrier to provide an output of 4 $n$ binary signals representing the position of at least part of the sensing device relative to the carrier in a cyclic permuting binary-decimal code in which each of the digits 0 to 9 of a cyclic permuting decimal code are represented by four signals of a binary code which is cyclic permuting at least for each unit change in the digits 0 to 9 and from 9 directly to 0.

References Cited in the file of this patent

UNITED STATES PATENTS

| | | |
|---|---|---|
| 2,318,591 | Couffignal | May 11, 1943 |
| 2,571,680 | Carbrey | Oct. 16, 1951 |
| 2,576,099 | Bray et al. | Nov. 27, 1951 |
| 2,607,891 | Townsend | Aug. 19, 1952 |
| 2,656,524 | Gridley et al. | Oct. 20, 1953 |
| 2,679,644 | Lippel | May 25, 1954 |
| 2,685,084 | Lippel | July 27, 1954 |
| 2,686,632 | Wilkinson | Aug. 17, 1954 |
| 2,705,105 | Paschen | Mar. 29, 1955 |
| 2,714,204 | Lippel et al. | July 26, 1955 |

Notice of Adverse Decision in Interference

In Interference No. 91,942 involving Patent No. 2,975,409, E. J. Petherick, Digital encoders and decoders, final judgment adverse to the patentee was rendered Mar. 26, 1964, as to claims 1, 14 and 16.

[*Official Gazette August 25, 1964.*]